US010235369B2

(12) United States Patent
Werner

(10) Patent No.: US 10,235,369 B2
(45) Date of Patent: Mar. 19, 2019

(54) DATA STORAGE ARRANGEMENT

(71) Applicant: FUJITSU LIMITED, Kawasaki-Shi (JP)

(72) Inventor: Steffen Werner, München (DE)

(73) Assignee: FUJITSU LIMITED, Kawasaki (JP)

( * ) Notice: Subject to any disclaimer, the term of this patent is extended or adjusted under 35 U.S.C. 154(b) by 525 days.

(21) Appl. No.: 14/437,735

(22) PCT Filed: Sep. 6, 2013

(86) PCT No.: PCT/EP2013/068480
§ 371 (c)(1),
(2) Date: Apr. 22, 2015

(87) PCT Pub. No.: WO2014/063856
PCT Pub. Date: May 1, 2014

(65) Prior Publication Data
US 2015/0278230 A1    Oct. 1, 2015

(30) Foreign Application Priority Data
Oct. 24, 2012    (DE) .................... 10 2012 110 164

(51) Int. Cl.
*G06F 7/00*    (2006.01)
*G06F 17/00*    (2006.01)
(Continued)

(52) U.S. Cl.
CPC ...... *G06F 17/30073* (2013.01); *G06F 3/0605* (2013.01); *G06F 3/067* (2013.01);
(Continued)

(58) Field of Classification Search
CPC ......... G06F 17/30598; G06F 17/30241; G06F 17/30312; G06F 17/30073; G06F 17/30297; G06F 11/1446; G06F 3/0605
(Continued)

(56) References Cited

U.S. PATENT DOCUMENTS 6,963,958 B2    11/2005  Linder
7,702,694 B1 *   4/2010  Perkins ............ G06F 17/30297
                                                    707/790
(Continued)

FOREIGN PATENT DOCUMENTS

EP    1 234 226 B1    8/2002
EP    1 727 033        11/2006
(Continued)

OTHER PUBLICATIONS

CentricStor V3.1D User Guide, Fujitsu Siemens Computers GmbH, 2007.
(Continued)

*Primary Examiner* — Md I Uddin
(74) *Attorney, Agent, or Firm* — Fujitsu Patent Center

(57) ABSTRACT

A computer arrangement includes a plurality of cluster systems each cluster system configured to archive data from at least one data processing installation, wherein each of the plurality of cluster systems is of modular design and includes at least one first component computer that receives data to be archived from the data processing installation, at least one mass memory system that buffer-stores the data to be archived, a second component computer that backs up the data to be archived on at least one further mass memory apparatus, and a cluster controller that controls the individual component computers of the respective cluster system; at least one data connection for data-oriented coupling of the plurality of cluster systems; and at least one composite controller that queries status data via a query interface of the cluster controllers of the plurality of cluster systems and transmits work orders to a control interface of the cluster controllers of the plurality of cluster systems.

8 Claims, 3 Drawing Sheets

(51) Int. Cl.
   *G06F 17/30* (2006.01)
   *G06F 3/06* (2006.01)
   *G06F 11/14* (2006.01)

(52) U.S. Cl.
   CPC ........ *G06F 3/0646* (2013.01); *G06F 11/1446* (2013.01); *G06F 2201/80* (2013.01); *G06F 2201/84* (2013.01)

(58) Field of Classification Search
   USPC ................................ 707/617, 654, 661, 692
   See application file for complete search history.

(56) References Cited

U.S. PATENT DOCUMENTS

| | | | | |
|---|---|---|---|---|
| 8,327,078 | B2* | 12/2012 | Berger | ................ G06F 12/0888 711/138 |
| 2003/0158999 | A1 | 8/2003 | Hauck et al. | |
| 2004/0128456 | A1 | 7/2004 | Kobayashi et al. | |
| 2006/0004786 | A1* | 1/2006 | Chen | ...................... G06Q 10/06 |
| 2007/0124407 | A1 | 5/2007 | Weber et al. | |
| 2011/0029730 | A1 | 2/2011 | Durocher et al. | |
| 2012/0126851 | A1* | 5/2012 | Kelem | ................ G06F 15/7867 326/38 |

FOREIGN PATENT DOCUMENTS

| | | |
|---|---|---|
| JP | 2000-322292 A | 11/2000 |
| JP | 2004-206496 A | 7/2004 |

OTHER PUBLICATIONS

Overeinder, B. J., et al, "A Dynamic Load Balancing System for Parallel Cluster Computing", *Future Generation Computer Systems*, vol. 12, 1996, pp. 101-115.

Schneider, R., "CentricStor FS Scale out File Services", 2008, (14 pages with English abstract).

* cited by examiner

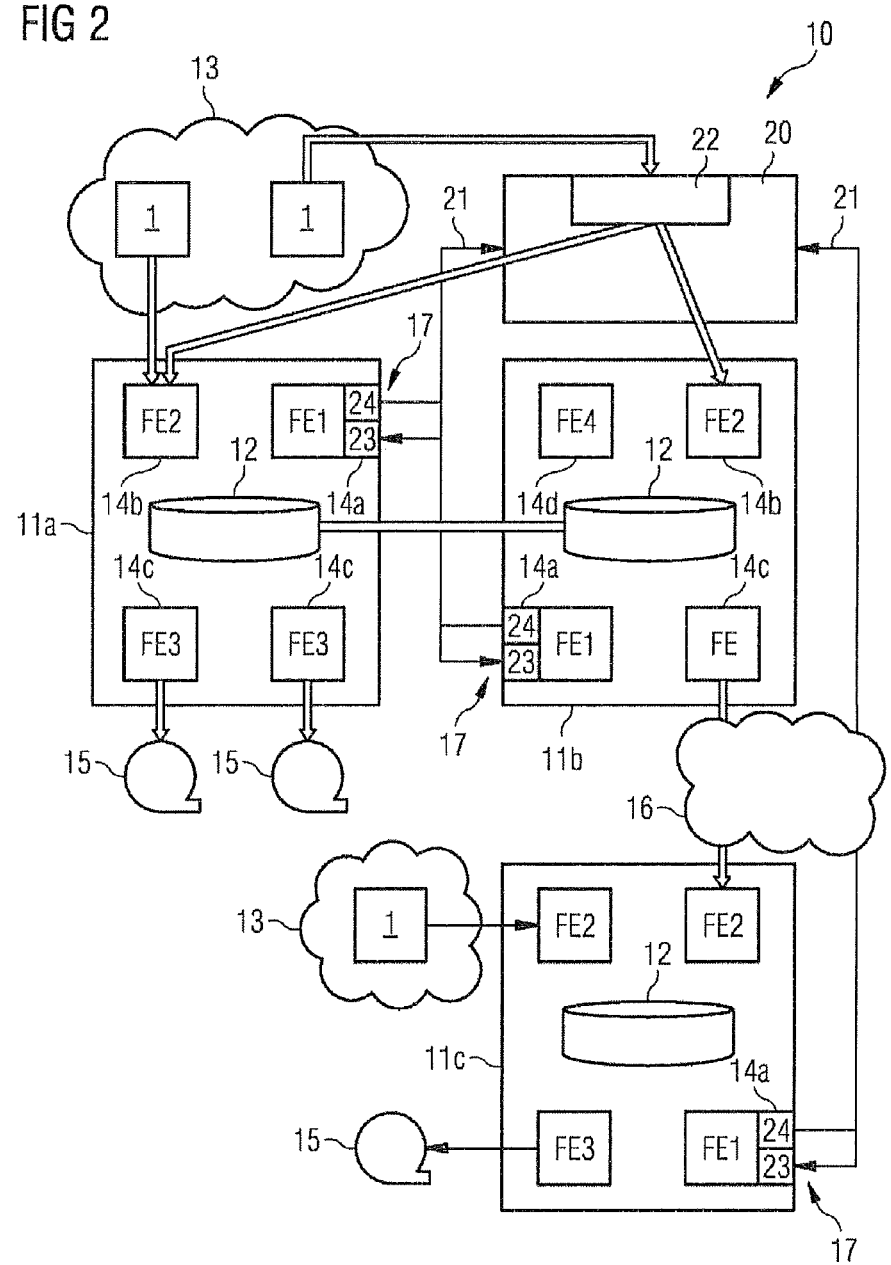

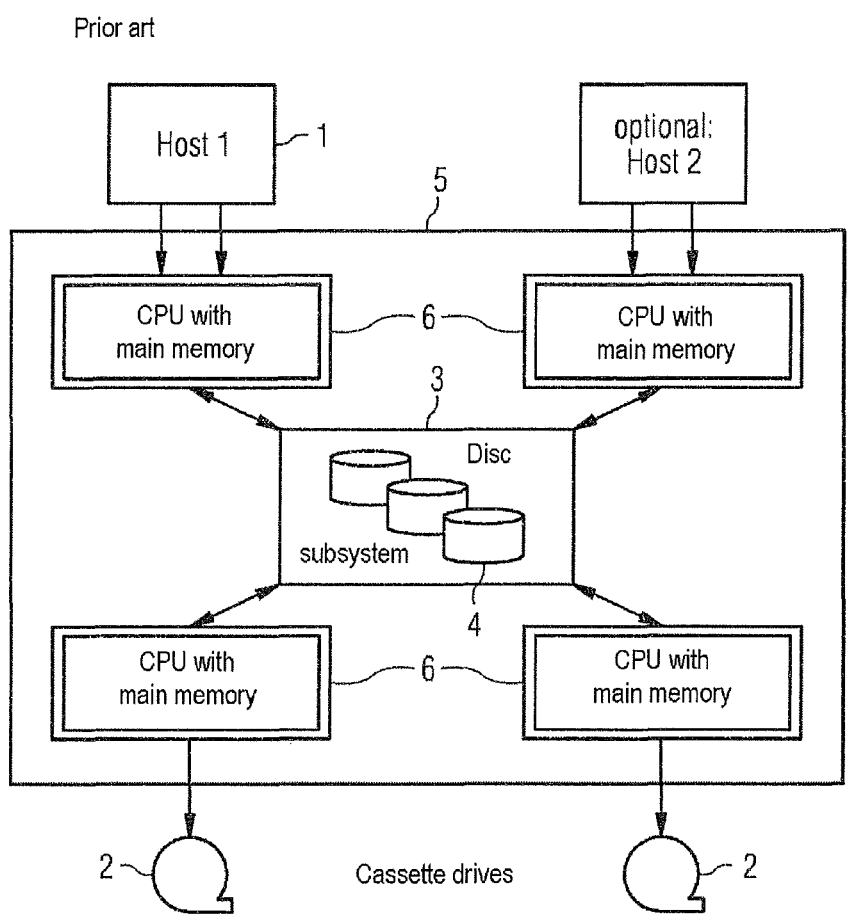

DATA STORAGE ARRANGEMENT

TECHNICAL FIELD

This disclosure relates to a computer arrangement comprising a plurality of cluster systems that archive data from at least one data processing installation.

BACKGROUND

Cluster systems that archive data from at least one data processing installation are known. By way of example, EP 1 234 226 B1 discloses a backup and archiving system using tape cassettes for data processing installations that is sold by Fujitsu Technologie Solutions under the name "CentricStor". The architecture of the backup and archiving system known as "CentricStor" is shown schematically in simplified form in FIG. 3.

The backup and archiving system shown in FIG. 3 connects to one or more hosts 1 and one or more cassette drives 2. The data from the host 1 are provided at data inputs. In addition, a disk storage subsystem 3 having at least one disk storage unit 4 is in place as part of a data-oriented coupling unit 5. The data-oriented coupling unit 5 connects to the hosts 1 and the cassette drives 2. Inside the data-oriented coupling unit 5 there are separate functional units that handle the data-oriented processes required for backup and archiving operations.

A first functional component coordinates and controls the data flows between the data inputs, the cassette drives 2 and the disk storage subsystem 3. A second functional unit undertakes transmission of data received at the at least one data input to the disk storage subsystem 3, while a third functional component transmits the data buffer-stored on the disk storage subsystem 3 to the at least one cassette drive 2.

In the configuration shown in FIG. 3, the second and third functional units are realized by two component computers 6 each that each have at least a CPU and main memory and connect to the disk storage subsystem 3. Some of the component computers 6 furthermore connect to at least one host 1 each on the host side for the purpose of handling the data transfers. Some other component computers 6 furthermore connect to a cassette drive 2 each on the cassette drive side. The number of component computers 6 can be chosen in variable fashion.

In comparison with other solutions, a backup and archiving system of that kind has relatively great flexibility with regard to acceptance of data to be archived on an input side and backup of the data to be archived on an output side. Nevertheless, even the flexibility of the system shown in FIG. 3 is subject to limits.

In particular, the outlay for further development of such a cluster system increases greatly when additional functionalities need to be integrated into the backup and archiving system. Examples of such additional functionalities are support for new host interfaces or mass memory apparatuses to back up the data to be archived, integration of additional internal components such as further disk subsystems or additional service components that execute service functions such as deduplication or compression of data, or provision of new user interfaces, for example, to actuate the backup and archiving system shown as a file server, from a remote site or using a new protocol.

It could therefore be helpful to provide an architecture for the further flexibilization of cluster systems that archive data. Preferably, new functions, hardware and software units and interfaces are intended to be able to be added without intervention in an existing cluster system.

SUMMARY

I provide a computer arrangement including a plurality of cluster systems each cluster system configured to archive data from at least one data processing installation, wherein each of the plurality of cluster systems is of modular design and includes at least one first component computer that receives data to be archived from the data processing installation, at least one mass memory system that buffer-stores the data to be archived, a second component computer that backs up the data to be archived on at least one further mass memory apparatus, and a cluster controller that controls the individual component computers of the respective cluster system; at least one data connection for data-oriented coupling of the plurality of cluster systems; and at least one composite controller that queries status data via a query interface of the cluster controllers of the plurality of cluster systems and transmits work orders to a control interface of the cluster controllers of the plurality of cluster systems.

I further provide a distributed archiving system including a plurality of cluster systems, each cluster system configured to archive data from at least one corresponding data processing installation, wherein each of the plurality of cluster systems is of modular design and includes at least one first component computer that receives data to be archived from the data processing installation, at least one disk-based mass memory system that buffer-stores the data to be archived, a second component computer that backs up the data to be archived on at least one further mass memory apparatus, and a cluster controller that controls the individual component computers of the respective cluster system; at least one data connection for coupling of the plurality of cluster systems and at least one composite controller that queries status data of the individual cluster systems via a query interface of the cluster controllers of the plurality of cluster systems and transmits work orders to a control interface of the cluster controllers of the plurality of cluster systems.

BRIEF DESCRIPTION OF THE DRAWINGS

FIG. 2 shows a schematic illustration of a computer arrangement according to an example.

FIG. 3 shows a schematic illustration of a known modular cluster system.

LIST OF REFERENCE SYMBOLS

Figure 1:
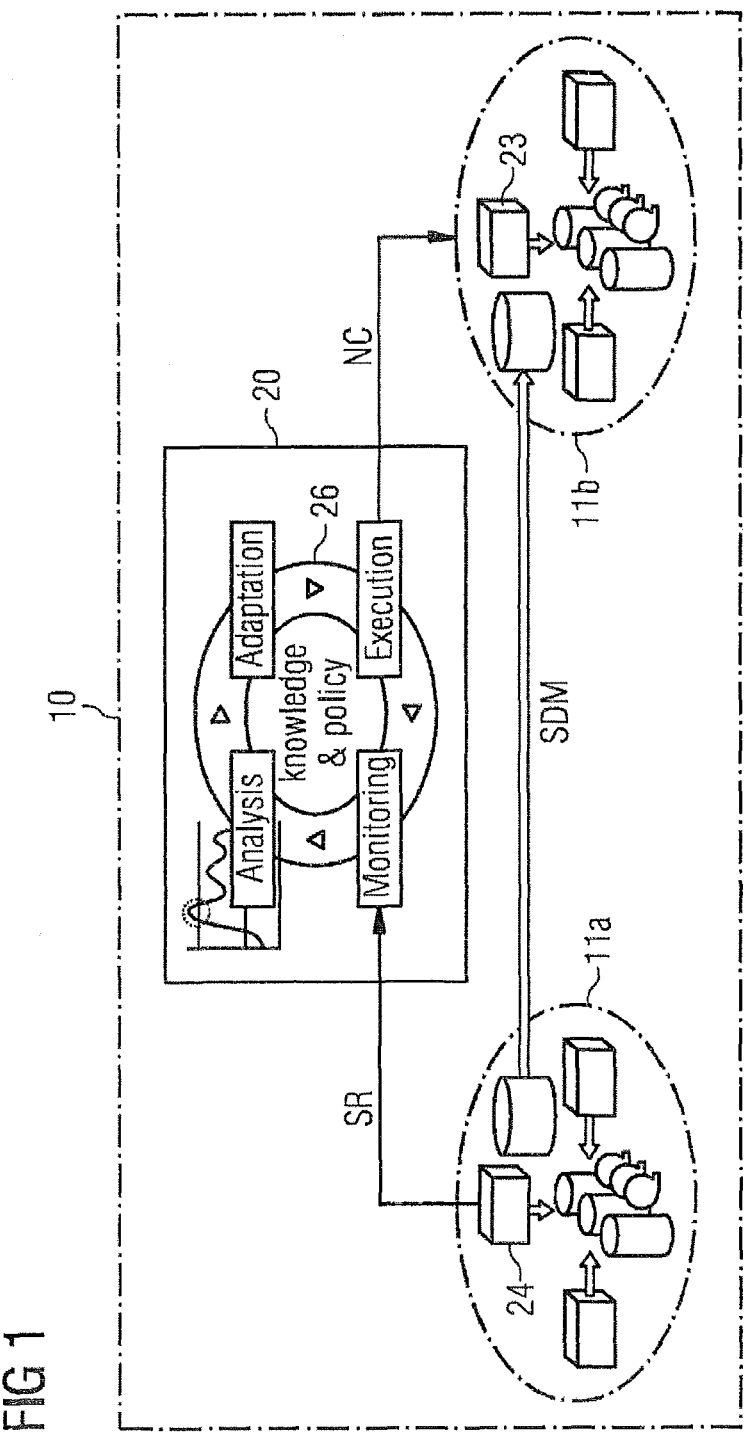
FIG. 1 shows a schematic illustration of a computer arrangement having a composite controller.

1 Host
2 Cassette drive
3 Disk memory subsystem
4 Disk memory unit
5 Data-oriented coupling unit
6 Component computer
10 Computer arrangement
11a Cluster system
11b Cluster system
11c Cluster system
12 Mass memory system
13 Data processing installation
14a Component computer for cluster controller
14b Front-end component computer
14b Back-end component computer 14*d* Component computer for duplication
15 Tape drive
16 Wide area network
17 Cluster controller
20 Composite controller
21 Control network
22 User interface
23 Control interface
24 Query interface
25 Memory network
26 Rule database
SR Status request
NC Control command
SDM Communication channel

DETAILED DESCRIPTION

I provide a computer arrangement comprising a plurality of cluster systems that archive data from at least one data processing installation. In this arrangement, each of the plurality of cluster systems is of modular design and comprises at least one first component computer that receives data to be archived from the data processing installation, at least one mass memory system to buffer-store the data to be archived, at least one second component computer that backs up the data to be archived on at least one further mass memory apparatus, particularly a magnetic tape memory apparatus, and a cluster controller that controls the respective component computers of the respective cluster system. The computer arrangement furthermore comprises at least one data connection for data-oriented coupling of the plurality of cluster systems and at least one composite controller that queries status data via a query interface of the cluster controllers of the plurality of cluster systems and that transmits work orders to a control interface of the cluster controllers of the plurality of cluster systems.

Provision of a query interface and a control interface that queries and controls the individual cluster systems, of a data connection for data-oriented coupling of the plurality of cluster systems and of at least one composite controller allows particularly flexible coupling of the components of different cluster systems in a common computer arrangement. In this case, functionality and performance of the computer arrangement can be augmented by adding further cluster systems with further and/or other types of component computers and other functional units without the need for intervention in one or more cluster systems already in place. Such an architecture affords a large number of further advantages explained in more detail below.

Preferably, the composite controller is a software component and at least one component computer of at least one cluster system of the plurality of cluster systems executes the software component. By way of example, the composite controller may be an additional software component that, together with the cluster controller, forms a piece of middleware of one, a plurality of or all of the interconnected cluster systems.

Each cluster system may execute the middleware so that each cluster system can make queries to the query interfaces of other cluster systems of the computer arrangement and transmit work orders to the control interfaces of other cluster systems of the computer arrangement. This allows, inter alia, automatic relocation or diversion of resources from one cluster system to another cluster system, for example, according to predetermined rules of a rule database.

Advantageously, the at least one composite controller provides a user interface for operator control of the computer arrangement comprising the plurality of cluster systems, wherein the user interface compiles an overall state of the computer arrangement on the basis of results from status requests to each of the cluster systems. A central user interface of this kind allows simple and uniform administration of the entire computer arrangement without the need for an administrator to access the plurality of cluster systems separately. In this case, it is not necessary for the overall state of the computer arrangement to be stored in the composite controller or one of the cluster systems.

Advantageously, the user interface furthermore may select a cluster system to execute a work order received via the user interface, on the basis of the utilization level of the individual cluster systems and/or of a predetermined rule database and transmits the work order to the control interface of the selected cluster system. Central order acceptance and allocation of this kind allows even utilization of the overall computer arrangement across the boundaries of individual cluster systems to be ensured, in particular.

Further advantageously, the composite controller may furthermore use the query interfaces of the cluster controllers to monitor an operating state of the individual cluster systems. When prompted by identification of an operating fault in a first cluster system, a first order to stop execution of a work order associated with the first cluster system is transmitted to the control interface of the cluster controller of the first cluster system. A second order to transmit buffer-stored data associated with the stopped work order from the first cluster system via the at least one data connection to the second cluster system is transmitted to the control interface of the cluster controller of the first and/or second cluster system. A third order to execute the stopped work order is transmitted to the control interface of the cluster controller of the second cluster system. Such a computer arrangement and composite controller allows reliability of the computer arrangement as a whole to be increased, in particular, by virtue of the composite controller being able to react flexibly to the failure of individual cluster systems.

The composite controller and/or a cluster controller may furthermore manage all of the mass memory systems for buffer-storing the data to be archived from the plurality of cluster systems using a network file system used by all cluster controllers jointly. A jointly used network file system of this kind allows access to buffer-stored data even if just some component computers of a faulted cluster system are not or no longer operating properly.

Further advantageously, the cluster controller of a first cluster system may transmit data buffer-stored in the first cluster system to a second cluster system via the at least one data connection when a predetermined event occurs. By way of example, the at least one data connection for data-oriented coupling of the plurality of cluster systems can comprise a network connection between the second component computer of a first cluster system and a first component computer of a second cluster system. In this case, the cluster controller of the first cluster system transmits data buffer-stored in the first cluster system to the second cluster system via the network connection upon request by the composite controller. Such an arrangement allows work orders to be transmitted from one cluster system to another cluster system without provision of additional connecting structures.

The at least one data connection for data-oriented coupling of the plurality of cluster systems may comprise at least one control network for interchanging status queries and work orders between the composite controller and the cluster controllers of the plurality of cluster systems and a memory network that interchanges buffer-stored data associated with the interchanged work orders between the mass memory systems of the plurality of cluster systems. Such splitting of the data connection for data-oriented coupling into a control network and a memory network allows meta data and data to be archived to be separated in respect of the different requirements of these two data types.

My arrangements and methods are described in detail below using different examples with reference to the figures.

FIG. 1 schematically shows the principle of controlling a computer arrangement 10 by a composite controller 20.

In FIG. 1, a first cluster system 11a is combined with a second cluster system 11b to form a computer arrangement 10. The first cluster system 11a has a query interface 24 that responds to status requests SR. The results of the status requests SR are supplied to the composite controller 20. The composite controller 20 comprises, inter alia, a rule database 26 that takes continual monitoring of the results of status requests SR to the cluster system 11a and an analysis of measured values contained therein as a basis to control the computer arrangement 10.

By way of example, the composite controller 20 caters for distribution of the archiving orders between the cluster systems 11a and 11b of the computer arrangement 10. Similarly, the composite controller can start or stop individual cluster systems 11a or 11b or portions thereof, in particular, individual component computers to cope with the overall utilization level of the computer arrangement 10. On the basis of the scheduled configuration changes and assignment of work orders, the composite controller 20 transmits control commands NC (node control) to control the second cluster system 11b to a control interface 23.

Within the computer arrangement 10, work orders can be flexibly distributed and also deferred. If the second cluster system 11b undertakes a work order from the first cluster system 11a, for example, on account of an excessively high utilization level or a fault in the first cluster system 11a, a logically or physically separate communication channel SDM (shared data move) that transmits jointly used data is used to transmit an associated data record from the cluster system 11a to the cluster system 11b. Whether the transmission in this case is initiated and/or coordinated by the composite controller 20, the first cluster system 11a or the second cluster system 11b is dependent on the respective implementation of the network technologies used and the coupling of the individual components among one another.

Possible examples of data-oriented coupling comprise the use of a shared memory network and/or a shared network file system by cluster systems 11a and 11b or the local controllers thereof. Alternatively, it is also possible to use direct or indirect coupling of individual cluster systems, as described in detail later with reference to FIG. 2 to transmit data via a wide area network.

By way of example, the instant of the transmission is determined by an automatically or manually stipulated control time for transmission of the data from one cluster system 11a to another cluster system 11b. Alternatively, the instant can also be determined on the basis of the utilization level of the cluster systems 11a and 11b involved or of the communication channel SDM.

FIG. 2 shows an example of a computer arrangement 10 having three cluster systems 11a, 11b and 11c. Each of the cluster systems 11a to 11c has a central mass memory system 12 to buffer-store data to be archived. Furthermore, the cluster systems 11a, 11b and 11c each comprise a dedicated local cluster controller 17, which undertakes the tasks of the first functional unit FE1, for example, in accordance with the backup and archiving system explained previously with reference to FIG. 3. In the example, the cluster controller 17 is implemented as a software component that runs on a component computer 14a of the respective cluster system 11a to 11c.

By way of example, the cluster systems 11a and 11c are each a backup and archiving system as has already been described previously with reference to FIG. 3. The cluster systems 11a and 11c each have one or more second functional units FE2 that receive data to be archived from a host 1 of one or more data processing installations 13. The second functional units FE2 are provided by one or more so-called front-end component computers 14b. Furthermore, the cluster systems 11a and 11c have so-called back-end component computers 14c that each provide third functional units FE3 to actuate and back up buffer-stored data from a mass memory system 12 on external mass memory apparatuses connected thereto, particularly the tape drives 15 shown in FIG. 2.

The design of the cluster system 11b differs from the design of the cluster systems 11a and 11c. In particular, the cluster system 11b is not directly coupled to a tape drive. Instead, the cluster system 11b has a further functional unit FE4 that deduplicates data stored on the internal mass memory system 12. The functional unit FE4 that deduplicates data is executed on a further component computer 14d, for example.

Deduplication of the data to be buffer-stored on the mass memory system 12 allows a relatively large number of data to be kept in the mass memory system 12. In particular, different versions of a backed-up data record can be kept in the mass memory system 12, provided that only the changes contained therein are additionally stored in each case. To ensure that the data stored in the mass memory system 12 are backed up even against total failure or destruction of the cluster system 11b, the cluster system 11b is coupled to the cluster system 11c via a wide area network 16, for example, the internet or a leased line between different sites of the individual cluster systems 11a to 11c. In this case, a back-end component computer 14b of the cluster system 11b is used to transmit the deduplicated data kept in the mass memory system 12 to a front-end component computer 14a of the cluster system 11c via the wide area network 16.

As stated above, the components and subsystems arranged in the computer arrangement 10 shown in FIG. 2 already allow a large number of functions of interest for archiving data of different types. To further simplify the management of the computer arrangement 10 and at the same time to achieve flexibilization for the use of the components contained therein, the computer arrangement 10 additionally comprises a composite controller 20 connected to the cluster controllers 17 of the individual cluster systems 11a to 11c via a control network 21. In the example shown in FIG. 2, the cluster controller 17 of the remotely set-up cluster system 11c is physically coupled to the composite controller 20 via the wide area network 16 in this case.

The composite controller 20 comprises, inter alia, a user interface 22 via which the computer arrangement 10 can be monitored, configured and controlled from a host 10 of the data processing installation 13. In this case, the composite controller 20, as shown in FIG. 2, may be a physically separate apparatus. Alternatively, the composite controller 20 can also run as a further software component within one or more of the cluster systems 11a, 11b and 11c, for example, on one of the component computers 14a to 14d.

For the purpose of monitoring, configuration and control, inter alia, by the composite controller, the individual cluster controllers 17 each have a control interface 23 and a query interface 24. The composite controller 20 can use the query interface 24 to query the respective state of each of the cluster systems 11a to 11c. In particular, it can be used to query whether the cluster systems 11a to 11c are fundamentally operational, how high the utilization level of the individual components installed therein, particularly the component computers 14a to 14d and the mass memory 12, is and what tasks have been assigned to the individual component computers 14a, 14b, 14c or 14d. On the basis of these data, the composite controller 20 can ascertain an overall state of the computer arrangement 10 and can use the user interface 22 to present it to a user of the computer arrangement 10.

If need be, a user can also use the user interface 22 to make changes to the current configuration, particularly assignment of resources to individual work orders and/or functional units FE1 to FE4. In this case, configuration of every single cluster system 11a, 11b or 11c is preferably stored and managed locally by its respective cluster controller 17 and merely combined and/or forwarded by the central composite controller 20.

Besides the presentation and/or manual configuration by a user, the collected data can also be used to automatically make a decision regarding allocation of newly arriving archiving requests by the data processing installation 13. By way of example, tasks accepted centrally via the user interface 22 can be forwarded by a host 1 of the data processing installation 13 to one of the cluster systems 11a, 11b or 11c, which currently has the lowest utilization level, for the purpose of archiving. Furthermore, work orders transmitted by an application of the data processing installation 13 directly to a cluster controller 17, for example, of the first cluster system 11a, can also be removed from a waiting list of the cluster system 11a via the composite controller 20 and allocated to a cluster system with a lower utilization level, for example, the cluster system 11b.

If data associated with the work order are already buffer-stored in the mass memory system 12 of the cluster system 11a, these data need to be transmitted from the cluster system 11a to the cluster system 11b. In the example shown, this is accomplished by a separate memory network 25, via which the mass memory systems 12 of the first cluster system 11a and of the third cluster system 11b are connected. As described above, the third cluster system 11c likewise connects to the cluster systems 11a and 11b, indirectly via the wide area network 16, so that further relocation of data from the cluster system 11b to the cluster system 11c is also possible.

Providing the control network 21, the control interface 23 and the query interface 24, providing additional data transmission paths such as particularly the memory network 25 between the cluster systems 11a, 11b and 11c and the coupling of the cluster systems 11b and 11c via the wide area network 16, and taking account of tasks received via the composite controller 20 allow the computer arrangement 10 to be controlled by the cluster controllers 20 as a uniform system.

Technical implementation of the control network 21 and the memory network 25 is of secondary importance to the architecture described above. However, it is advantageous for the memory network 25 to transmit relatively large, contiguous data to be implemented using a technology that provides a large transmission bandwidth. By way of example, a suitable technology is the fiber channel protocol based on a broadband connection technique such as Gigabit Ethernet based on the IEEE standard family 802.3. By contrast, the control network 21 needs to be used to transmit only a relatively small volume of data. To coordinate the individual cluster controllers 17 with one another and with the composite controller 20 promptly, a network technology with relatively low latency should be used for this network, however. By way of example, a conventional local area network with a limited number of subscribers is suitable for the control network 21. Appropriate segmentation, virtualization or prioritization means that both the subnetworks can also be implemented by a shared physical or logical data network.

In a further alternative not shown in FIG. 2, the composite controller 20 is part of a piece of middleware that comprises not only the composite controller 20 itself, but also the cluster controller 17 for the individual cluster systems 11a, 11b and 11c.

The middleware described controls the overall computer arrangement 10 when required, the tasks thereof comprising, inter alia, monitoring of system events such as failure of adjacent cluster systems 11a, 11b or 11c or failure of individual component computers 14a, 14b, 14c or 14d, for example. Furthermore, the middleware allows processes executed on the individual cluster computers to be started or stopped, or configuration within a cluster system 11a, 11b or 11c or the overall computer arrangement 10. To this end, the middleware connects to all essential portions of the computer arrangement, for example, via the control network 21, and has access to information stored in the computer arrangement such as meta information concerning tasks to be accomplished, for example, which are stored on one or more of the mass memory systems 12.

The control network 21 effectively interconnects the middleware components of the cluster systems 11a, 11b and 4 so that reciprocal monitoring and control become possible. In this example, the middleware acts first as a data capture section for requests from adjacent cluster systems and second as an action element within a cluster system, but also, with an outward effect on adjacent cluster systems, as a controller.

An advantage of these and similar solutions is that each of the cluster systems 11a, 11b or 11c can undertake control of the overall computer arrangement 10. In particular, this provides redundancy toward failure of an individual cluster system 11a, 11b or 11c and of a single, central composite controller 20.

Three scenarios, including associated rules of a rule database 26, for example, for use in the computer arrangement 10 described, are described below. These are just some of a large number of possible use scenarios.

Scenario 1: Temporary Relocation of Physical Tape Drives Following Failure

In normal operation, a cluster system 11 can use any functional unit FE3 of the component computers 14c to address any physical tape drive 15. By way of example, each component computer 14c of the cluster system 11a can initially have two associated tape drives 15. In the scenario described, both physical tape drives 15 of a third functional unit FE3 of the cluster system 11a fail completely. That is to say that this functional unit FE3 cannot execute further backup orders without further physical tape drives 15. The functional unit FE3 and the component computer 14c itself that is used to execute the latter remain in an operational state, however.

If further physical tape drives, for example, a tape drive 15 of a further component computer 14c, connect to the functional unit FE3 of the first cluster system 11a via a suitable network, for example, a fiber channel storage network, then the functional unit FE3 can also access this further tape drive 15. In this case, the association concerning which specific functional unit FE3 can access which physical tape drives 15 is determined solely by the configuration controlled by the middleware of the cluster system 11a, particularly the first functional units FE1. The first functional unit FE1 of the cluster system 11a knows the number of assigned physical tape drives 15.

In the scenario described, the rule database 26 contains a rule that when all physical tape drives 15 assigned to a prescribed functional unit FE3 fail, a further functional unit FE3 having an additional tape drive 15 and is preferably in the same cluster system 11a needs to be sought. Subsequently, configuration of the cluster system 11a is changed such that the functional physical tape drives 15 still available overall are distributed as evenly as possible over the functional units FE3 of the cluster system 11a. As a result, failure of one or more tape drives 15 is recorded by a third functional unit FE3. Fully automatic means ensure that all functional units FE3 of the cluster system 11a remain fully operational. That is to say that the third functional units FE3 of the cluster system 11a can back up to the remaining physical tape drives 15 with a higher data throughput.

In the scenario described, equalization has been performed within a single cluster system 11a. When there are a plurality of connected cluster systems, equalization can also be performed across boundaries of a single cluster system, for example, by reconfiguring adjacent cluster systems 11a and 11b, or between coupled cluster systems 11b and 11c to compensate for local resource failures.

Scenario 2: Temporary Relocation of Orders in the Event of Overload

Reference is again made to the computer arrangement 10 shown in FIG. 2. In this case, however, unlike in scenario 1 above, the physical tape drives 15 of the first cluster system 11a do not fail. The first cluster system 11a captures measured values that provide information about a backed-up data rate in MB/s to the physical tape drives 15. It is therefore possible to compute whether a volume of data that currently needs to be backed up fits an available time window.

For this purpose, the rule database 26 contains the following rules, for example. When a volume of data to be backed up cannot be backed up in a time window provided for it, the first functional unit FE1 compares the utilization level of the individual third functional units FE3 of the cluster system 11a. In so doing, the third functional unit FE3 with the lowest load is found and also the functional unit FE3 with the highest utilization level. Subsequently, as described above with reference to scenario 1, reconfiguration of the cluster system 11a relocates a tape drive 15 from a functional unit FE3 with a low utilization level to a functional unit FE3 with a high utilization level.

Should this be insufficient to observe the prescribed constraints, input data streams are possibly diverted from one or more hosts 1 to another cluster system 11b or 11c by reconfiguring the computer arrangement 10. The result obtained is load equalization accompanied by an increase in backup speed too.

Scenario 3: Distribution of Allocations According to Time Zones

The initial situation considered here is the two cluster systems 11a and 11c set up and operated in different time zones. A user has a respective work profile at different sites, for example, that a full backup for a host 1 needs to be performed during the local night time at each site. Assuming that the backup takes two hours and the sites are in Berlin and Moscow with a time difference of two hours, it would be conceivable, in principle, for the backup to be started at all sites at the same local time with the same back-end devices, for example, the same tape drive 15. If the backup begins at 22:00 hours local time in Moscow (20:00 hours Berlin time) and takes two hours, the tape drive 15 and the associated third functional unit FE3 can subsequently be changed over for the first site in Berlin, so that the backup in Berlin can likewise begin at 22:00 hours local time. This achieves a permanent utilization level for the back end comprising the functional unit FE3 and for the tape drive 15.

In this case, the rule database 26 comprises the rule that the tape drives are configured at 22:00 hours local time in Moscow for use with the cluster system 11a at that location. This involves all physical tape drives 15 being allocated to the first cluster system 11a. Subsequently, that is to say at 22:00 hours local time in Berlin, it is 24:00 hours in Moscow and the backup has ended. The cluster control 20 then reconfigures the computer arrangement 10 such that all tape drives 15 are allocated to the second cluster system 11c in Berlin. The backup in Berlin can then be performed at full capacity.

As a result, the physical tape drives 15 are in operation for four hours without interruption. If further cites in other time zones are available or the backup windows are enlarged, the effect that can be achieved is that the physical tape drives 15 are in operation without interruption. This allows better distribution of the sometimes very high level of investment in expensive physical tape drives 15.

The examples and scenarios described above result in a computer arrangement that has a series of advantages compared to the known cluster systems.

First, provision of a composite controller 20 allows operator control of the computer arrangement using a single user interface 22. Furthermore, extension of the system both in terms of new functions and in terms of a capacity extension is made possible by mere addition of a further cluster system. The extendability and opportunity for relocation of individual requests to other cluster systems mean that the computer arrangement 10 is thus practically arbitrarily scalable. The previously existing limitations such as the number of slots existent within a cluster system, are overcome by the multilevel hierarchy based on the architecture model described above so that practically infinite scaling of the computer arrangement 10 is possible.

In addition, particularly the combination of a composite controller with the memory network 25 allows manual or automatic relocation or diversion of resources from one cluster system 11a to another cluster system 11b or 11c so that it is possible to ensure even load distribution.

Finally, availability of the computer arrangement 10 as a whole is increased since failure of a cluster system 11a prompts a cluster system 11b or 11c connected thereto to be able to undertake the tasks thereof.

The invention claimed is:

1. A computer arrangement having a multilevel, hierarchical architecture, the computer arrangement comprising:
   a plurality of cluster systems including at least a first and a second cluster system on a first level of the multilevel, hierarchical architecture, each cluster system configured to archive data from at least one data processing installation, wherein each of the plurality of cluster systems is of modular design and comprises at least one first component computer, at least one mass storage system comprising a disk storage subsystem, a second component computer, and a cluster controller;

at least one data connection for data-oriented coupling of the plurality of cluster systems, comprising at least one control network that interchanges status queries and work orders between at least one composite controller and the cluster controllers of the plurality of cluster systems and a storage network that interchanges buffer-stored data associated with the interchanged work orders between the mass storage systems of the plurality of cluster systems; and the at least one composite controller in the form of a software component executed by at least one component computer of at least one cluster system of the plurality of cluster systems on a second level of the multilevel, hierarchical architecture, the at least one composite controller and the cluster controller of the at least one cluster system forming a piece of a middleware of the at least one cluster system, the at least one composite controller configured for distribution of work orders between the plurality of cluster systems of the computer arrangement, wherein the work orders are instructions for an operation to back up and archive data; wherein metadata and data to be archived are separated based on data type;

the first component computer of the first cluster system receives the data to be archived from the at least one data processing installation, the data to be archived belonging to a work order associated with the first cluster system;

the at least one mass storage system of the first cluster system buffer-stores the data to be archived;

the at least one composite controller queries status data of the first and second cluster system via the at least one control network and at least one query interface of the cluster controllers of the first and second cluster system;

upon occurrence of a predetermined system event, the at least one composite controller transmits a first order to stop execution of the work order associated with the first cluster system via the at least one control network to a control interface of the cluster controller of the first cluster system, transmits a second order to transmit the buffer-stored data associated with the stopped work order via the at least one control network to the control interface of the cluster controller of the first and second cluster system, and transmits a third order to execute the stopped work order via the at least one control network to the control interface of the cluster controller of the second cluster system; and wherein upon receipt of the second order, the cluster controller of the first and second cluster system transmits data buffer-stored by the at least one mass storage system of the first cluster system to the second cluster system via the storage network; and upon receipt of the third order, the cluster controller of the second cluster system controls the second component computer of the second cluster system to back up the data to be archived on at least one mass storage apparatus allocated to the second cluster system.

2. The computer arrangement according to claim 1, in which each cluster system executes the middleware so that each cluster system can make queries to the query interfaces of other cluster systems of the computer arrangement and can transmit work orders to the control interfaces of other cluster systems of the computer arrangement.

3. The computer arrangement according to claim 1, in which the at least one composite controller provides a user interface for operator control of the computer arrangement comprising the plurality of cluster systems, wherein the user interface compiles an overall state of the computer arrangement on the basis of results from status requests to the query interfaces of the plurality of cluster systems.

4. The computer arrangement according to claim 3, in which the user interface further selects a cluster system to execute a work order, received via the user interface, on the basis of a utilization level of the individual cluster systems and of a predetermined rule database and transmits the work order to the control interface of the selected cluster system.

5. The computer arrangement according to claim 1, in which the composite controller furthermore uses the at least one query interface of the cluster controllers to monitor an operating state of the individual cluster systems, to be prompted by identification of an operating fault in the first cluster system to transmit the first order to stop execution of a work order associated with the first cluster system to the control interface of the cluster controller of the first cluster system, transmit the second order to transmit buffer-stored data associated with the stopped work order from the first cluster system via the at least one data connection to the second cluster system to the control interface of the cluster controller of the first and second cluster system, and transmit the third order to execute the stopped work order to the control interface of the cluster controller of the second cluster system.

6. The computer arrangement according to claim 1, in which the composite controller and the cluster controllers furthermore manage all of the mass storage systems that buffer-store the data to be archived from the plurality of cluster systems using a network file system jointly used by all cluster controllers.

7. The computer arrangement according to claim 1, in which the cluster controller of the first cluster system transmits the data buffer-stored in the first cluster system to the second cluster system via the storage network when the predetermined event occurs.

8. The computer arrangement according to claim 1, wherein the at least one mass storage apparatus comprises a tape drive.

* * * * *